L. L. KNOX.
VALVE MECHANISM FOR REVERSING REGENERATIVE FURNACES.
APPLICATION FILED APR. 3, 1918.

1,397,380.

Patented Nov. 15, 1921.
4 SHEETS—SHEET 1.

WITNESSES

INVENTOR

L. L. KNOX.
VALVE MECHANISM FOR REVERSING REGENERATIVE FURNACES.
APPLICATION FILED APR. 3, 1918.

1,397,380.

Patented Nov. 15, 1921.
4 SHEETS—SHEET 2.

WITNESSES
R. H. Balderson
F. H. Windridge

INVENTOR
L. L. Knox
by Bakewell, Byrnes & Parmelee
Attys

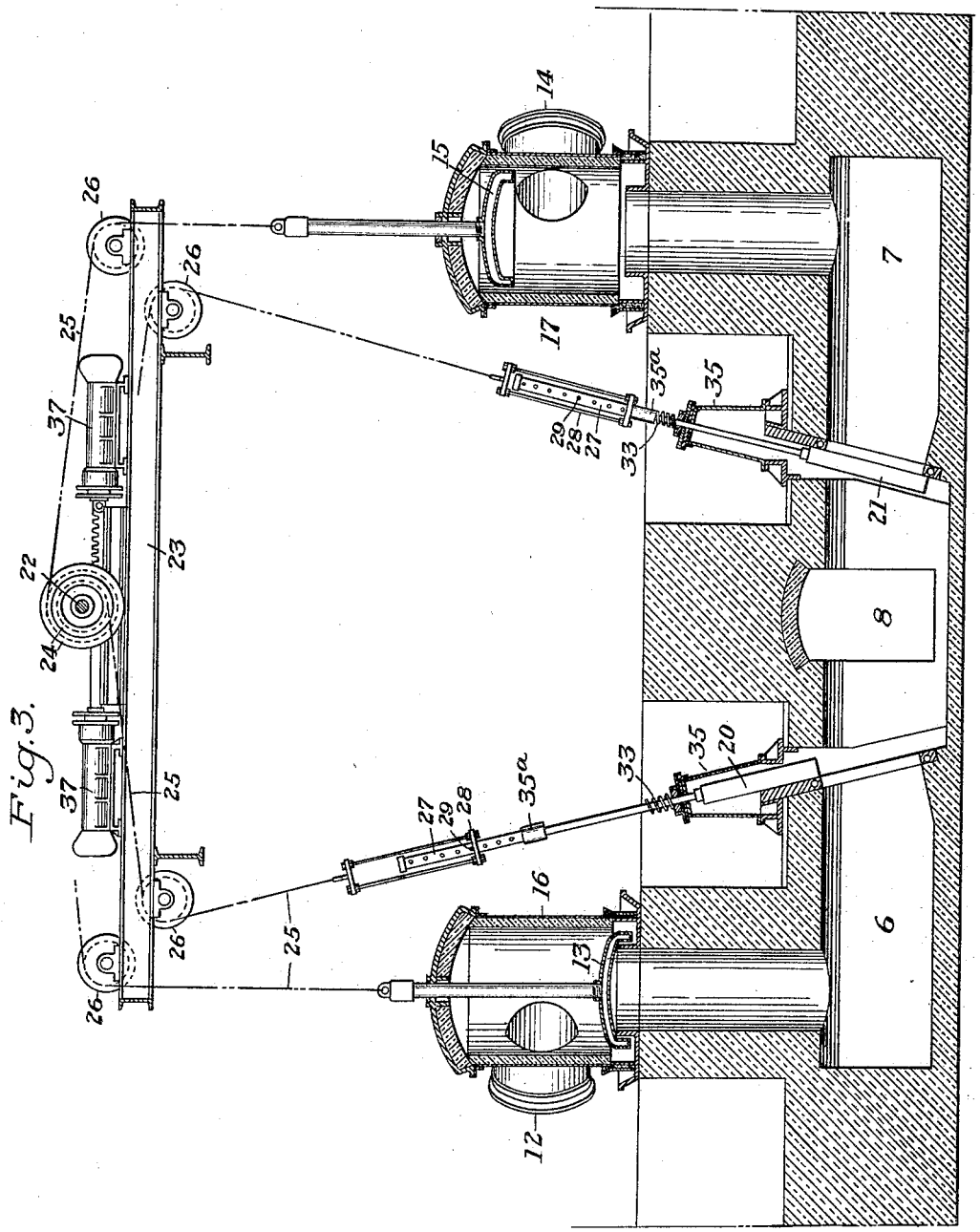

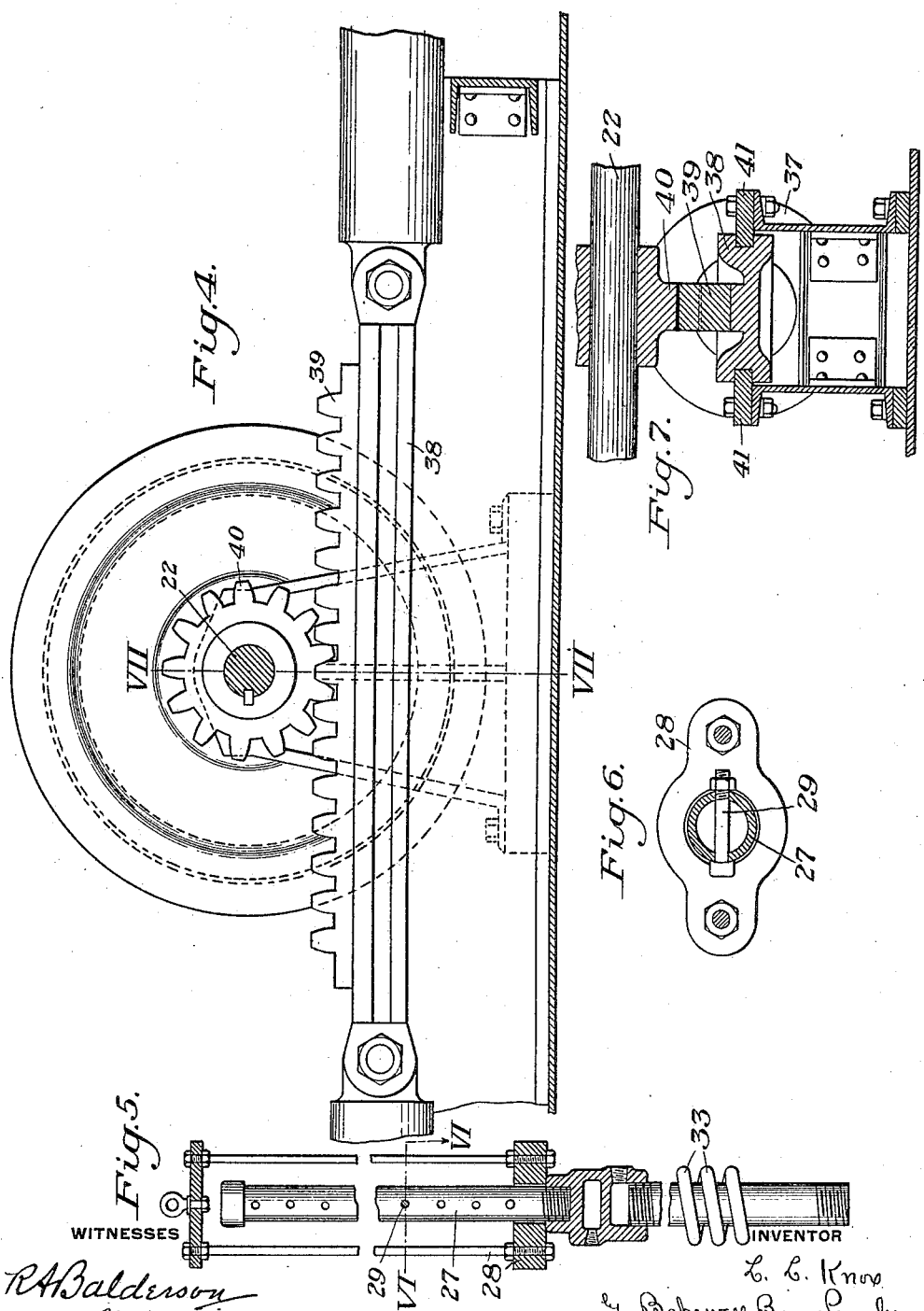

UNITED STATES PATENT OFFICE.

LUTHER L. KNOX, OF BELLEVUE, PENNSYLVANIA.

VALVE MECHANISM FOR REVERSING REGENERATIVE FURNACES.

1,397,380.

Specification of Letters Patent.   Patented Nov. 15, 1921.

Application filed April 3, 1918.   Serial No. 226,402.

*To all whom it may concern:*

Be it known that I, LUTHER L. KNOX, a resident of Bellevue, in the county of Allegheny and State of Pennsylvania, have invented a new and useful Improvement in Valve Mechanism for Reversing Regenerative Furnaces, of which the following is a full, clear, and exact description, reference being had to the accompanying drawings, forming part of this specification, in which—

Figs. 2 and 3 are views taken, respectively, on the lines II—II and III—III of Fig. 1;

Fig. 4 is a side view of a portion of the motive device;

Fig. 5 is a detail sectional view of one of the lost motion connections and its spring buffer;

Fig. 6 is a section on the line VI—VI of Fig. 5; and

Fig. 7 is a section on the line VII—VII of Fig. 4.

My invention has relation to valve mechanism for reversing regenerative furnaces, and is designed to provide a simple and efficient system of reversing valves, together with operating mechanism therefor. A further object of my invention is to provide a valve-operating mechanism in which the plurality of valves necessary for the control of the furnace may be operated from a single double-acting motive device through a system of simple and easily arranged connections. A still further object of my invention is to provide a simple and efficient mechanism for cushioning the closing action of the damper valves employed.

The nature of my invention will be best understood by reference to the accompanying drawings, in which I have shown the preferred embodiments thereof, and which will now be described, it being premised, however, that various changes can be made in the details of construction and arrangement of the parts without departing from the spirit and scope of my invention as defined in the appended claims.

Figure 1:
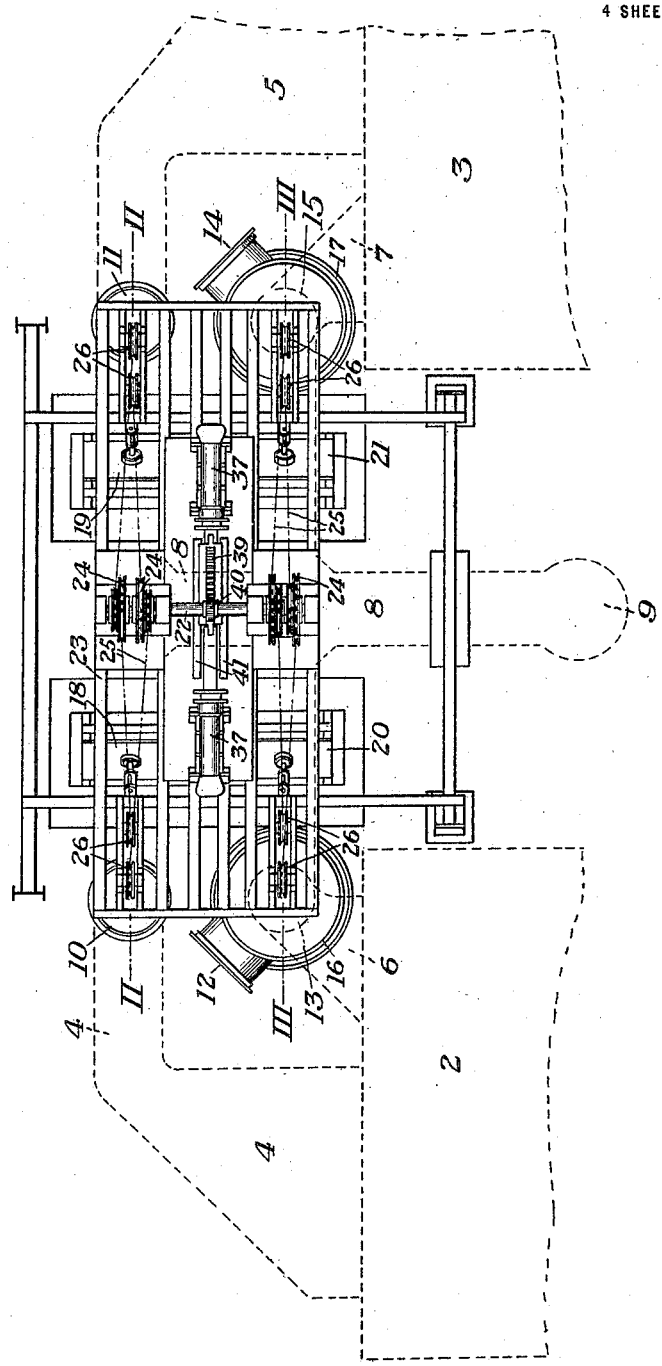
Figure 1 is a plan view largely diagrammatic of valve mechanism embodying my invention.

In these drawings, the numeral 2 designates a portion of the air and gas regenerators at one end of a reversible regenerative furnace, and 3 the similar regenerators at the opposite end of the furnace, these regenerators, together with their port connections to the valves, being shown in dotted lines in Fig. 1. 4 designates the air port leading from the regenerator 2; 5 the similar port leading from the regenerator 3; 6 the gas port leading from the regenerator 2; and 7 the similar gas port leading from the regenerator 3, all these ports communicating at their other ends with a flue 8, leading to a stack connection 9, the ports 5 and 7 entering the flue 8 from one side, and the ports 4 and 6 entering said flue at its opposite side.

The port 4 is provided with an air inlet valve 10, and the port 5 has a similar air inlet valve 11. These valves may be, in general of any suitable character, such as the lift valves shown in detail in Fig. 2. The gas inlet port 5 has a gas inlet 12, controlled by a valve 13, and the gas inlet port 7 has a gas inlet port 14, controlled by the valve 15. The valves 13 and 15 may be, in general, of any suitable form and arrangement, such as the mushroom valves shown in Fig. 3, these valves being arranged within the respective inlet chambers 16 and 17.

The numeral 18 designates a damper valve which is placed in the flue 4 between the air inlet 10 and the flue 8; and 19 is a similar damper valve which is placed in the flue 5 between the air inlet valve 11 and the flue 8.

The numeral 20 designates a damper valve which is placed in the gas port 6 between the gas inlet valve 13 and the flue 8; and 21 is a similar damper valve which is placed in the port 7 between the gas inlet valve 15 and the flue 8.

Figure 2:
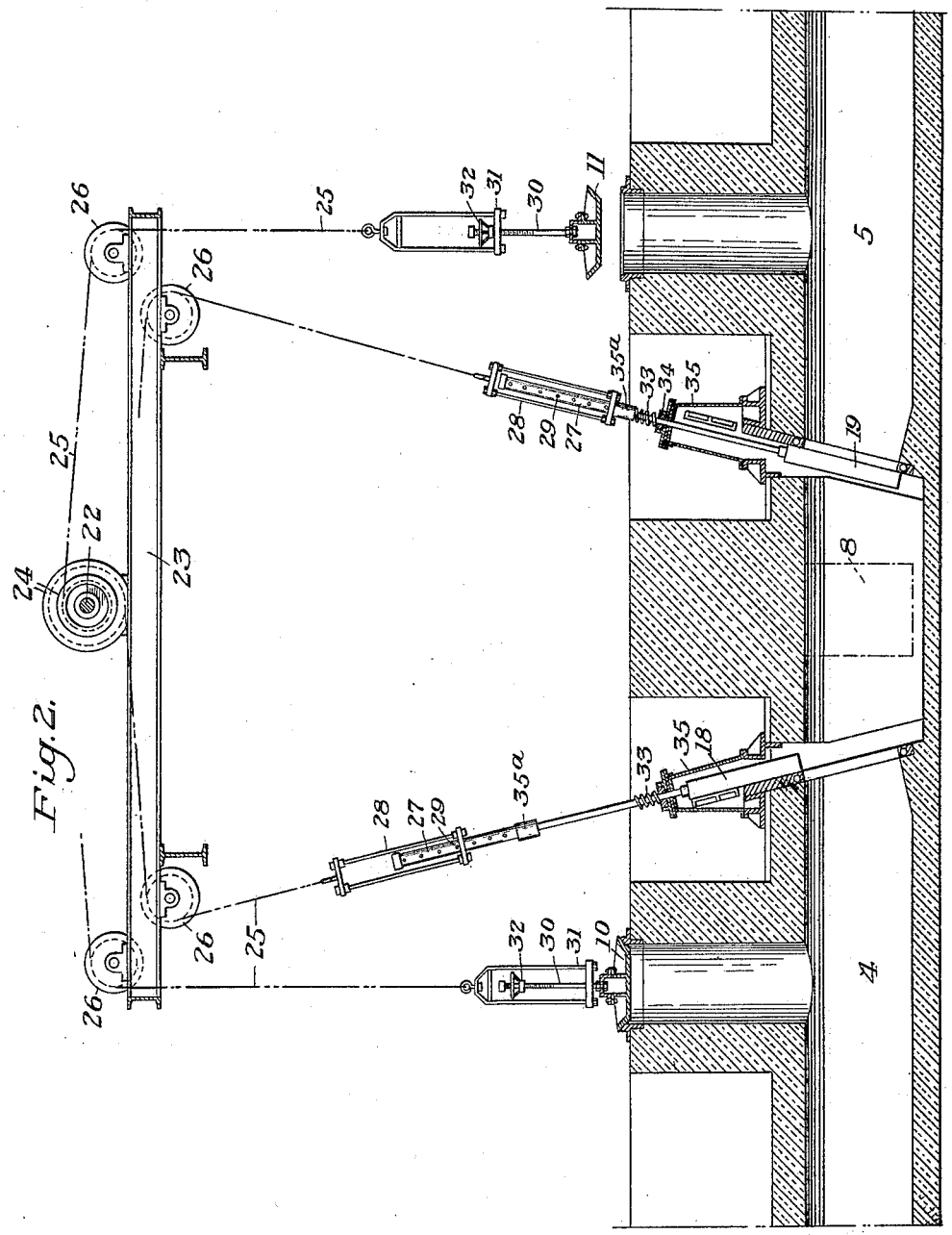

The numeral 22 designates a transverse shaft which is suitably journaled on a framework 23, suitably supported above the valves. Secured to this shaft 22 is a series of pulleys 24. A flexible rope or cable 25 is connected at one end to each of these pulleys, and its opposite end is connected to one of the valves, suitable guide wheels or sheaves 26 being provided for such connections. The arrangement of these several connections will be readily understood from Figs. 1, 2 and 3. The connections are so arranged that, as shown in Figs. 2 and 3, the rotation of the shaft 22 will effect a reverse operation of the two valves of each pair of valves. That is to say, the air inlet valve 10 will be closed when the air inlet valve 11 is opened and vice versa; the gas inlet valve 13 will be closed when the gas inlet valve 15 is opened and vice versa; the air control damper valve 18 will be opened when the opposite valve 19 is closed and vice versa; and the gas control valve 20 will be opened when the opposite valve 21 is closed and vice versa. The connections 25 are preferably attached to each of the valves 18, 19, 20 and 21, through an adjustable lost motion device. In the drawings, I have shown each of these devices as consisting of an upward extension 27 of the valve stem, which is slidably engaged by a yoke 28, to which the connection 25 is directly attached. Each of the extensions 27 is provided with a plurality of holes therefor, in any one of which a pin 29 may be inserted (see Fig. 5) to thereby limit the sliding movement of the yoke in said extension.

The air inlet control valves 10 and 11 are also shown as provided with lost motion connections, in which the stem of each of these valves is provided with an upward extension 30, slidably engaged by a yoke 31, to which the connection 25 is attached, the sliding movement of the yoke in the extension being limited by an adjustable nut 32.

By reason of these lost motion connections, it will be readily seen that one of the valves of each pair of valves having this device will commence to close before the opposite valve of that pair commences to open.

I also preferably provide each of the damper valves with a buffer for cushioning its closing movement. Each of these buffers is shown as consisting of a helical spring 33, which is seated on the stem of the valve with an abutment at its lower end at 34, on the valve casing 35, while its upper end is designed, when brought into action, to be engaged by a collar or enlargement 35ª on the valve stem. It will be readily seen from Figs. 2 and 3 that as each of the damper valves approaches its closed position, the corresponding buffer spring may be engaged and compressed, thus easing the seating movement and protecting the valve against injury. The collars 35ª may, as shown in Fig. 5, be arranged to provide for circulating connections for circulating and cooling fluid through the valves.

The shaft 22 is actuated by a single double-acting motive device, comprising the two opposite hydraulic cylinders 37, whose plungers are connected by a member 38, carrying a rack bar 39, whose teeth engage a pinion 40 on said shaft 22. The cylinders 37 are arranged to be reversed by any usual or suitable mechanism, to thereby alternately rotate the shaft 22 into opposite directions.

The member 38 may be provided with suitable guides 41, as shown in Fig. 7.

The advantages of my invention will be apparent to those familiar with reversing valve arrangements of this general character. It will be noted that all the port and flue connections between the regenerators and the stack connection may be at substantially the same level; that the system of valves is symmetrically arranged; that all of these valves are actuated by a single double-acting motive device, and that the connections between said motive device and the several valves are of simple and easily arranged character.

I claim:

1. Furnace reversing mechanism, comprising a pair of valves for controlling the flow through the air ports, a second pair of valves for controlling the flow through the gas ports, a pair of air inlet valves, and a pair of gas inlet valves, a single actuating shaft for all the valves, means for turning said shaft in both directions, a single separate actuating cable for each of said valves, said cables being all connected to said shaft at one end and to the respective valves at the opposite ends, all of said cables being connected directly to their respective valves, some rigidly and others of said cables being connected to their valves through adjustable telescopic members, whereby some of the valves will be actuated simultaneously and others thereof non-simultaneously, substantially as described.

2. Valve mechanism for reversing regenerative furnaces, comprising a vertically movable valve or damper having an upwardly projecting stem provided with a plurality of perforations, a yoke slidably engaging said stem, a pin carried by the stem and adapted to engage any one of the perforations, and an actuating connection attached to said yoke, substantially as described.

3. Valve mechanism for reversing regenerative furnaces, comprising a vertically movable valve or damper having an upwardly projecting stem provided with a plurality of perforations, a yoke slidably engaging said stem, a pin carried by the yoke and adapted to engage any one of the perforations, and an actuating connection attached to said yoke, the stem also having a spring buffing means below said yoke and externally of the valve or damper casing, substantially as described.

In testimony whereof, I have hereunto set my hand.

LUTHER L. KNOX.